United States Patent

Yates

[15] 3,649,320

[45] Mar. 14, 1972

[54] COUPLING AGENT COPOLYMERS OF AMINE SILICATES AND ORGANOFUNCTIONAL SILANES

[72] Inventor: Paul C. Yates, Wilmington, Del.

[73] Assignee: E. I. du Pont de Nemours and Company, Wilmington, Del.

[22] Filed: Feb. 16, 1970

[21] Appl. No.: 11,772

[52] U.S. Cl............................106/287, 106/308, 117/100, 117/124, 117/126, 161/192, 260/37, 260/41
[51] Int. Cl............................................................C09k 3/00
[58] Field of Search...........................260/448.2 N, 448.2 E; 106/287 B, 308, 287; 117/126 GS, 100 A

[56] References Cited

UNITED STATES PATENTS

| 3,475,375 | 10/1969 | Yates | 117/100 A |
| 2,689,245 | 9/1954 | Merrill | 260/247 |
| 3,068,199 | 12/1962 | Sellers | 117/126 GS |

*Primary Examiner*—Theodore Morris
*Attorney*—Lynn N. Fisher

[57] ABSTRACT

Coupling agent formulations comprising compatible mixtures of an organofunctional silane and an amine silicate and reinforcing fillers treated with such formulations.

5 Claims, No Drawings

COUPLING AGENT COPOLYMERS OF AMINE SILICATES AND ORGANOFUNCTIONAL SILANES

BACKGROUND OF THE INVENTION

This invention is directed toward coupling agent formulations comprising compatible mixtures of an organofunctional silane and an amine silicate having a degree of polymerization less than 1,000; and reinforcing fillers treated with such formulations.

Organofunctional silanes are well known in the laminate-forming arts as excellent coupling agents for bonding organic resins to embedded reinforcement materials. Ordinarily, reinforcement materials are coated with and bonded to coupling agents and then embedded in the impregnating resins which in turn bond with functional groups on the coupling agents. Selection of the proper organofunctional silane is usually determined by choosing a coupling agent with a functional group that is capable of undergoing a known polymerization-condensation with one or more of the functional groups of the impregnating resin. Proper matching of silane organic functional groups with those of the impregnating resin is essential to the formation of strong, water-resistant chemical linkage of the two materials. It appears that only a percentage of the total number of silane organic functional groups polymerize with the condensable reactive sites of the organic resins. Therefore the spacing of functional organic groups on the reinforcement material, to more closely correspond with the location of the condensable reactive sites on the resins, can substantially reduce the amount of silane needed in a size or a finish without any reduction in bonding efficiency and strengths.

I have found that the formulation of the organofunctional silane with an amine silicate enables one to better control the spacial arrangement of the coupling agent along the surface of the reinforcement material. By manipulation of the spacing of the coupling agent to more closely correspond to the coreactive sites on the polymeric resins, comparable or superior bonding is attained, accompanied by a substantial reduction in the amount of silane needed in the size or finish.

SUMMARY OF THE INVENTION

In summary, this invention pertains to coupling agent formulations comprising compatible mixtures having 25 to 90 percent of the total silicon percent in the form of an organofunctional silane of the general formula

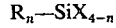

wherein
R is selected from the group consisting of carboxyalkenyl, alkyl, aminoalkyl, thioalkyl, and epoxy substituted alkyl, where the alkyl or alkenyl has one to 18 carbon atoms;
X is selected from the group consisting of hydroxyl, halogen, alkoxy having one to six carbon atoms, aryloxy, and amino;
$n$ is a positive integer of from one to three;
and having 10 to 75 percent of the total silica present in the form of an amine silicate wherein the degree of polymerization of the polysilicate is less than 1,000 and the amine component is at least one amine selected from the group consisting of (I) compounds having the formula:

wherein $R_1$, $R_2$, and $R_3$ are independently selected from the group consisting of hydrogen, alkyl having one to six carbon atoms, and alkanol having one to six carbon atoms, with the proviso that $R_1$, $R_2$, and $R_3$ cannot all be hydrogen; (II) morpholine, and (III) cyclohexylamine, the amine being present in an amount of at least 0.1 mole per mole of silica introduced in the form of the amine silicate. The compositions of this invention may also contain a small amount of a strong inorganic or organic base such as sodium, potassium or lithium hydroxide, or tetramethylammonium or guanidine hydroxide, so long as the molar ratio of silica in the composition relative to the molar ratio of $M_2O$, where M is the cation of the strong base, is greater than six. Some of the amine silicates are described in greater detail in a patent to Weldes, U.S. Pat. No. 3,326,910, and others in the applicant's copending application, Ser. No. 823,185.

DESCRIPTION OF THE INVENTION

This invention is specifically directed toward coupling agent formulations comprising amine silicates having a degree of polymerization of less than 1,000, and an organofunctional silane compound of the formula

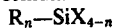

and methods for coupling reinforcement materials to organic resins.

The coupling agent formulations of this invention, specifically the amine silicate-organosilane copolymer, can be further formulated with other processing additives such as organic resinous bonding agents, lubricants, emulsifiers, antifoaming agents and antistatic agents for sizing or finishing reinforcement materials. These coupling agent formulations, when present in sizing or finishing solutions, can be applied to reinforcing materials with no sacrifice of bonding efficiency or strength.

Coupling Agent Formulation Components

The organofunctional silane compounds which can be used in the coupling agent formulations of this invention have the general formula

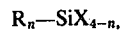

wherein
R is selected from the group consisting of carboxyalkenyl, alkyl, aminoalkyl, thioalkyl and epoxy substituted alkyl, where the alkyl or alkenyl have one to 18 carbon atoms;
X is selected from the group consisting of hydroxyl, halogen, alkoxy having one to six carbon atoms, aryloxy, and amino.

The organofunctional silanes of this invention are multifunctional compounds and can be readily hydrolyzed and polymerized with amine silicates, copolymerized with each other, and copolymerized with organic, impregnating resins.

The preferred organofunctional silanes have R groups such as acrylate, methacrylate, methacryloxypropyl, gamma-aminopropyl, vinyl, alkyl, methallyl, crotyl and stearyl and X groups such as methoxy and ethoxy.

The organofunctional silanes which are most preferred for the coupling agent formulations of this invention are gamma-methacryloxy-propyl-trimethoxysilane, gamma-aminopropyl-triethoxysilane and vinyl triethoxysilane.

The amine silicates which can be used in the coupling agent formulation of this invention have a degree of polymerization of the polysilicate of less than 1,000 and the amine component is at least one amine selected from the group consisting of (I) compounds having the formula:

wherein $R_1$, $R_2$, and $R_3$ are independently selected from the group consisting of hydrogen, alkyl having one to six carbon atoms, and alkanol having one to six carbon atoms, with the proviso that $R_1$, $R_2$, and $R_3$ cannot all be hydrogen; (II) morpholine, and (III) cyclohexylamine, the amine being present in an amount of at least 0.1 mole per mole of silica in the form of the amine silicate. The compositions of this invention may also contain a small amount of a strong inorganic or organic base such as sodium, potassium or lithium hydroxide, or tetramethylammonium or guanidine hydroxide, so long as the molar ratio of silica in the composition relative to the molar ratio of $M_2O$, where M is the cation of the strong base, is greater than 6. Some of the amine silicates are described in greater detail in a patent to Weldes, U.S. Pat. No. 3,326,910, and others in the applicant's copending application Ser. No. 823,185.

The degree of polymerization can be measured by techniques known in the art which are sensitive to the molecular weight of polymeric molecules, such as by measurements of the intrinsic viscosity, by light scattering, by measurements of the osmotic pressure, or by measurements of the elevation of the boiling point or depression of the freezing point of the solution.

Molecular weight can also be determined by procedures specific to silica, such as titration with a gelatin, as given in an article by R. K. Iler and P. S. Pinkney (Ind. Eng. Chem. 39, 1379 (1947), by measurement of the rate of color development using a molybdic acid colorimetric reagent as disclosed in an article by G. B. Alexander ("The Polymerization of Monosilicic Acid," J. Am. Chem. Soc., 76, 2094 (1954)).

The amine silicate should have a degree of polymerization less than 1,000 and preferably less than about 100. The most highly preferred are amine silicates having a degree of polymerization less than 10.

The most preferred amine silicates are those of dimethylamine and of ethanolamine. Also highly preferred are compositions of dimethylamine or ethanolamine with small amounts of strong stabilizing bases in addition to the amines. Sodium hydroxide, potassium hydroxide, guanidine hydroxide and tetramethylammonium hydroxide in molar ratio proportions of 10 to 1 to 30 to 1 are preferred, where these refer to molar ratio of silica to $M_2O$, M being the cation of the strong base.

In the formulation of coupling agent solutions of this invention, the organofunctional silanes can be hydrolyzed and then mixed with the amine silicates. Alternatively, the amine silicate constituent itself functions as a catalyst for the hydrolysis of the organosilanes; thus mixing the two essential ingredients in aqueous solution causes hydrolysis and polymerization condensation to occur spontaneously.

The copolymerization of the amine silicates with the organosilanes increases the functionality for condensation reactions in the resulting copolymers and at the same time increases the variety of spacing of functional group arrangements possible for the copolymers relative to those that could be obtained with the organosilanes alone. The larger the number of exposed functional groups on the amine silicate-silane copolymers, the greater the probability of copolymerizing with the impregnating resin. Unfortunately, multifunctional silanes when proximately polymerized to reinforcement materials causes such reinforcement materials to become very hydrophobic, thereby resulting in poor wetting of the materials with impregnating resins.

The copolymerization of the amine silicate with organofunctional silanes prior to sizing or finishing the reinforcing materials, permits the use of these polyfunctional silanes without the concomitant disadvantages encountered when such groups are proximately bonded to the reinforcing materials. In addition, the copolymerization of silane with amine silicates enables substantial reduction in the total amount of organofunctional silanes needed to coat the reinforcing materials. The reduction in concentration of silane does not reduce bonding efficiency or strengths; quite the contrary, the corresponding spacing and improved wetting in some instances produces superior results.

It is hypothesized that comparable and superior bonding strengths and reduced silane concentrations are probably attributable to a more efficient matching of organosilane functional groups with the condensable reactive sites on the resin, or possibly the more numerous and more complex bonding of the coupling agent copolymers to the reinforcement materials.

In summary, the addition of the amine silicates increases the number of reactive sites which can bond to the reinforcing materials further permits the use of multifunctional silanes, thereby enhancing copolymerization with the impregnating resins and reduces the total concentration of organosilane needed to achieve comparable or superior bonding strengths. Because of this multiple bonding, both at the site of reinforcing materials and at the copolymerization sites of the resins, adhesion to the reinforcing materials is substantially increased. In addition, water resistance is correspondingly enhanced. Resinous laminates structurally reinforced with the compositions of this invention have dry and wet strengths and modulus of rupture values equal to or greater than resinous laminates where organofunctional silanes are used alone.

Preparation of Coupling Agent Formulations

The coupling agent formulations are prepared by mixing the two essential ingredients in their proper proportions in an appropriate solvent. As previously noted, the organofunctional silane contributes 25 to 90 mole percent of the total silicon present in the formulation and the amine silicate comprises 10 to 75 mole percent of the total silicon present in the formulation. Generally, mixing of the essential ingredients is performed in dilute aqueous solution. This minimizes the possibility of premature reaction between the essential ingredients. The combined concentration of the essential ingredients in the formulation will range from one tenth to ten per cent by weight of the formulation, with 0.25 to 2 percent being preferred.

Caution must be exercised with certain rather easily hydrolyzed R groups, such as gamma-methacryloxypropyl, since the ester linkage in this R group is susceptible to hydrolysis. The amine silicate compositions of this invention, being basic in character, will tend to promote this hydrolysis if excessive times are allowed after contacting the two ingredients prior to applying to the surfaces of the glass fibers and drying down. To avoid the possibility of hydrolyzing this susceptible ester linkage, the gamma-methacryloxypropyltrimethoxysilane should be first hydrolyzed in aqueous solution and this mixed just prior to application with the amine silicate constituent of the invention.

After hydrolysis of the organosilane and mixture with the amine silicates, the compositions of the invention will have a pH between 8 and 11, depending on the concentration. Particularly in the lower pH range the compositions of the invention will have a tendency toward raid polymerization and should be applied promptly to the reinforcing fillers to avoid the possibility of gelation. At the upper pH range the solutions are stable for longer periods of time, ranging up to 12 hours or more.

Methods of Treating Reinforcing Materials with Coupling Agent Formulations

Formulations of hydrolyzed, partially polymerized essential ingredients of this invention can be applied to the reinforcing fillers in any convenient manner. Normally, a reinforcing filler is immersed in the dilute aqueous solution containing the coupling agent formulation, removed from the treating bath, and excess moisture wrung out. The proper concentration of coupling agent formulation (essential ingredients) will range from 0.01 to 20 percent by weight by essential ingredients based on the weight of the reinforcing material. Ordinarily 0.25 percent to 10 percent weight is preferred. Ordinarily the reinforcing materials having the greatest surface area will contain larger amounts of essential coupling agent formulation components. Low surface area materials, such as glass fibers, can be bound to the organic resins with lower concentrations of coupling agent.

After immersion and removal of excess moisture (solvent) the coated support materials are rapidly dried at temperatures as high as 200° C. provided, however, that the organic portions of the coupling agent do not undergo degradation at these temperatures. This rapid curing completes the polymerization of the constituents with one another and the bonding of the coupling agent to the support material. Although drying can be accomplished at room temperature, curing between temperatures of 50° and 180° C. is recommended and preferred. Of course, curing times will vary inversely with the temperature and may range from a few minutes at 200° C. to 24 hours at room temperature.

A more economic and convenient method for applying a coupling agent to support materials, is the treatment of these materials with coupling agents as an integral step in their manufacture. In a typical sizing process, the various components of the size are premixed and applied to the reinforcement materials by padding or spraying methods.

Because the size is designed to perform a plurality of functions (for instance, bond multifilamentous glass fibrils into a coherent strand, protect support materials from self abrasion and chemical degradation during handling or weaving and couple the support materials to polymeric resins), it can contain several components in addition to coupling agents. A typical size for glass fibers can contain organic resinous bonding agents, lubricants, antistatic agents, emulsifiers, and coupling agents.

Reinforcing Materials

A reinforcing material is a substance which when incorporated into or coupled to the organic resin (impregnating resin) enhances the strength and modulus of the cured laminate. Reinforcing materials of this invention can be in the form of rovings, fabrics, continuous and chopped-strand mat, chopped strands and milled fiber. Among the more popular of the reinforcing materials are the "low sodium glass fibers ('E' glass fibers and beta-glass fibers)" asbestos, sisal, cotton, quartz, glass microspheres, graphite, refractory alumina silicate fibers, and metal whiskers.

"Low sodium glass fibers" are by far the most popular of the reinforcing materials, and are preferred for the laminate compositions of this invention. Compositions of "low sodium" glass fibers can, and often do, vary; however, low alkali metal oxide content is essential. Typical low sodium glass fibers can have the following compositions:

| Elements | Per Cent of Content |
|---|---|
| $SiO_2$ | 54.3% |
| $Al_2O_3$ and $Fe_2O_3$ | 15.2% |
| CaO | 17.3% |
| MgO | 4.7% |
| $B_2O$ | 8.0% |
| $Na_2O$ and $K_2O$ | 0.6% |

It has become rather common practice to incorporate less expensive filler materials into the laminating composition for reasons of economy and in some instances for reasons of esthetics.

Representative of the filler materials which can be incorporated into the laminating composition of this invention are kaolin, calcium carbonate, talc, chrysotile asbestos, alumina, zircon, zirconium, magnesium oxide, colloidal amorphous silica, attapulgite, wollastonite, perlite, fly ash, calcium silicate, aggregate and fibers.

The amount of reinforcing materials present in the composition may be as little as 1 percent by weight and as high as 90 percent by weight of the laminated particle, depending, of course, on the relative densities of the resins, the reinforcing materials and the method of fabrication.

Impregnating Resins

The organic resinous materials which copolymerize with the organofunctional groups of the coupling agent composition are amorphous, organic, semisolid or solid materials produced by union (polymerization or condensation) of a large number of molecules of one, two or less frequently three relatively simple compounds. Resin, as the term is used in this invention embraces both synthetic and chemically modified natural resins. Among the more useful organic resinous materials which can be bonded to reinforcement or substrate materials with the coupling agent formulations of this invention are the saturated and unsaturated polyester resins, the epoxy resins, the phenolic resins, the melamine resins, the ureaformaldehyde resins, polystyrene, copolymerized styrene-acrylonitrile, polypropylene, polyethylene, polyacetal, polycarbonate, copolymerized acrylonitrile-butadiene-styrene, polyvinyl chloride, polyurethane, polysulfone, polyphenyl oxide, and fluoroplastics.

Methods of Bonding Reinforcing Materials to Organic Impregnating Resins

The coated support material is cut in the shape of the object to be laminated, placed on the laminate die and covered with sufficient impregnating resin to wet the support material. Support material or resin are successively layered one atop another until the requisite ply laminate is attained. After layering, excess resin and air bubbles are squeezed out by rolling the laminate between rubber rollers. The slightly compressed laminate can then be hot-pressed until the resin sets or melts. After hot-pressing is complete the laminate is cooled and removed from the die. The resulting laminate will exhibit both excellent wet and dry strengths which will equal or exceed those attained where undiluted organofunctional silanes are used alone to bond the impregnating resins to the reinforcing materials.

The following examples are presented to further illustrate, not limit, this invention. Parts and percentages as they are used in the examples, refer to weight unless otherwise stipulated. EXAMPLE 1

The amine silicate essential ingredient is prepared by weighing 1,500 parts of a sodium silicate commercial solution having 30 percent $SiO_2$ and 8.7 percent sodium oxide designated Du Pont "F" Grade sodium silicate into 300 parts of distilled water. This is stirred in a high speed steel stirrer, and 2,725 parts of a dimethylamine form of a cation exchange resin is stirred into it for 5 minutes. This resin is a sulfonated polystyrene polymer having approximately 4 milliequivalents of ion exchange capacity per gram of dry resin and is prepared by reacting the corresponding hydrogen form of the resin with an excess of aqueous dimethylamine solution, followed by washing. The resin is filtered off and treatment continued with a second portion of 2,725 parts of dimethylamine form of the ion exchange resin. After treatment with the second portion of resin, the product is recovered and found to contain 18.1 percent $SiO_2$, 0.20 percent $Na_2O$, and to be 2.07 normal in dimethylamine. The degree of polymerization of this material is approximately 30. 11.5 parts by weight of vinyl triethoxysilane are mixed with 13.65 parts by weight of the amine silicate prepared above and 28.5 parts by weight of a 1N solution of dimethylamine, and this mixture is made up to 1,000 parts by weight with water.

This mixture is applied to three 11 inch wide strips of "E" glass fabric, style 181, heat-cleaned glass. The strips are soaked in the treating solution for approximately 3 minutes and passed through a wringer and the wet pickup measured. The tension on the rollers is adjusted to give a wet pickup of approximately 50 percent. These strips are placed on clean towels and dried for 10 minutes at 125° C. in an air-circulating oven. They are rinsed in water for approximately 12 minutes, wrung out, placed on clean towels and dried for 10 minutes at 125° C. They are then cut into four 9 inch wide panels in the warp direction and trimmed to 10 inch along the fill direction, the edges being then frayed to a depth of about three-eighths inch by pulling out longitudinal threads.

495 Parts by weight of a polyester resin consisting of a mixture of styrene with a maleic anhydride-glycol polyester copolymer, called Rohm & Haas "Paraplex" P43, are mixed with 5 parts by weight of benzoyl peroxide powder, which is dispersed in the resin by mechanically stirring while heating the resin to 43° C. The resin-benzoyl peroxide catalyst mixture is then maintained at 43° C. for approximately 20 minutes.

While the catalyzed resin is held at 43° C., a ½ inch×12.5 inch×12.5 inch steam cover plate is placed on a hot plate maintained at the same temperature, and covered with a 12.5 inch×12.5 inch ferrotype chromium plate. A 60 inch×30 inch strip of cellophane is located on the plate, and the laminate dye is sprayed with a release agent, which is an aerosol of zinc stearate. A ⅛ inch×12.5 inch×12.5 inch metal plate with a ⅛ inch×10.5 inch×9.5 inch cutout is then placed on the dye, covered with the cellophane, and the glass fabric panels are laid on the dye with each layer being treated with sufficient resin to cover and wet in the glass fabric. Twelve pieces of fabric are used to make 12-ply laminate, and the excess resin and air bubbles are squeezed out by rolling with a rubber roller. The laminate is then covered with the folded cellophane, a second ferroplate placed on top and the whole assembly of dye and resin enclosed in aluminum foil.

This is placed in a hydraulic ram press preheated to 175° F. and pressed at a pressure of 7 tons per square inch, which serves to eliminate the excess resin. It is held at 175° F. for 15 minutes and then heated to 225° F. and held at this temperature for 20 minutes. It is then heated to 275° F. and held at this temperature for 20 minutes. The heat is turned off, the press cooled to 240° F. with air, after which cooling water is pressed through the heaters to cool the press to 225° F. Pressure is relieved, the laminates removed and cut into 1 inch×4.5 inch test bars, which are sanded to a thickness of 0.5 inch ±0.02 inch.

The modulus of rupture of these bars is determined on a 2 inch span with an Instron tester. Five bars are tested to determine the dry strength and an additional five bars tested to determine the average wet strength, following boiling in water for a two hour period.

The rupture strength of this laminate is 71,500 p.s.i. when dry and 53,100 p.s.i. after boiling.

For comparison, a laminate prepared using the organosilane alone at an identical level of silicon atoms on the glass cloth and adjusted to the same total basicity using dimethylamine has a dry transverse rupture strength of 70,600 p.s.i. and a wet strength of 63,100 p.s.i. Thus it will be noted that the much less expensive 50:50 amine silicate-organsilane mixture has substantially as high a strength as the pure organosilane.

EXAMPLE 2

The same procedures and materials as used in Example 1 are employed, except that the relative proportions of the organosilane and the amine silicate are adjusted to give 75 percent of the treating silicon atoms in the form of the organosilane and 25 percent in the form of the amine silicate. The dry strength of this laminate is found to be 76,000 p.s.i. and the wet strength 67,000 p.s.i. Here again it will be noted that the amine silicate may be substituted for the organosilane, and in this instance actually give a stronger laminate than is obtained using the organosilane alone. It is noted that glass cloth treated with this composition and the composition of Example 1 has a softer hand and a much lower tendency to generate static charges in handling than the organosilane treated control described in Example 1.

I claim:

1. An aqueous coupling agent formulation consisting essentially of from 25 to 90 percent of the total silicon present in the form of an organofunctional silane of the general formula $$R_n-SiX_{4-n}$$

wherein

R is selected from the group consisting of carboxyalkenyl of one to 18 carbon atoms, alkyl of one to 18 carbon atoms, aminoalkyl of one to 18 carbon atoms, thioalkyl of one to 18 carbon atoms and epoxy substituted alkyl of one to 18 carbon atoms;

X is selected from the group consisting of hydroxyl, halogen, alkoxy of one to six carbon atoms, and amino;

n is a positive integer of from one to three;

and from 10 to 75 percent of the total silica present in the form of an amine silicate having a degree of polymerization less than 1,000 and the amine component being at least one amine selected from the group consisting of (I) compounds having the formula:

wherein $R_1$, $R_2$ and $R_3$ are independently selected from the group consisting of hydrogen, alkyl of one to six carbon atoms and alkanol of one to six carbon atoms, with the proviso that $R_1$, $R_2$ and $R_3$ cannot all be hydrogen simultaneously; (II) morpholine, and (III) cyclohexylamine, the amine being present in an amount of at least 0.1 mole per mole of silica in the form of an amine silicate.

2. An aqueous coupling agent formulation of the composition of claim 1 wherein 50 to 90 percent of the total silicon are in the form of an organofunctional silane and 10 to 50 percent are in the form of an amine silicate.

3. An aqueous coupling agent formulation of the composition of claim 1 wherein the amine silicate is dimethylamine or ethanolamine.

4. An aqueous coupling agent formulation of the composition of claim 3 wherein the organofunctional silane is vinyltriethoxysilane, gamma-aminopropyltriethoxysilane or gamma-methacrylopropyltrimethoxysilane.

5. A reinforcing filler material coated with 0.01 to 20.0 percent by weight of a polymerized coupling agent formulation of the composition of claim 1.

* * * * *